United States Patent
Biring (10) Patent No.: US 9,558,565 B2
(45) Date of Patent: Jan. 31, 2017

(54) DIMENSION CALCULATION METHOD FOR A SEMICONDUCTOR DEVICE

(71) Applicant: MATERIALS ANALYSIS TECHNOLOGY INC, Hsinchu (TW)

(72) Inventor: Sajal Biring, Hsinchu (TW)

(73) Assignee: MATERIALS ANALYSIS TECHNOLOGY INC., Hsinchu (TW)

(*) Notice: Subject to any disclaimer, the term of this patent is extended or adjusted under 35 U.S.C. 154(b) by 337 days.

(21) Appl. No.: 14/175,278

(22) Filed: Feb. 7, 2014

(65) Prior Publication Data

US 2015/0228065 A1 Aug. 13, 2015

(51) Int. Cl.
*G06T 7/60* (2006.01)
*G06T 7/00* (2006.01)

(52) U.S. Cl.
CPC ............. *G06T 7/602* (2013.01); *G06T 7/0083* (2013.01); *G06T 2207/10056* (2013.01); *G06T 2207/20136* (2013.01); *G06T 2207/30148* (2013.01)

(58) Field of Classification Search
None
See application file for complete search history.

(56) References Cited

U.S. PATENT DOCUMENTS

| | | | | |
|---|---|---|---|---|
| 6,608,910 B1 * | 8/2003 | Srinivasa | ........... | G06K 9/00362 382/100 |
| 2004/0223197 A1 * | 11/2004 | Ohta | ................. | G06F 17/30271 358/538 |
| 2004/0234106 A1 * | 11/2004 | Luu | ........................ | G06T 7/0012 382/106 |
| 2007/0052845 A1 * | 3/2007 | Adams | .................... | H04N 7/012 348/452 |
| 2007/0108456 A1 * | 5/2007 | Wong | ..................... | B82Y 20/00 257/94 |
| 2009/0212212 A1 * | 8/2009 | Shishido | ............... | G03F 1/0092 250/307 |
| 2010/0046828 A1 * | 2/2010 | Anilturk | ............. | G03F 7/70491 382/145 |
| 2012/0076394 A1 * | 3/2012 | Nikaido | .................. | G06T 5/002 382/145 |

OTHER PUBLICATIONS

Richard J. Wolski, (CCM Modular Processor Users' Guide), Oct. 1987, p. 1-89.*

* cited by examiner

*Primary Examiner* — Jason Heidemann
*Assistant Examiner* — Brian Shin
(74) *Attorney, Agent, or Firm* — Hauptman Ham, LLP (57) ABSTRACT

An automatic calculation method for thickness calculation of a deposition layer in a Fin-type field-effect transistor (FinFET) is disclosed through mapping edge lines onto an Excel spreadsheet. The similar method is also applied to the thickness calculation of superlattice or multiple quantum well for a light emitting diode (LED). The edge lines are obtained and transformed from an electronic image taken by Transmission Electron Microscopy (TEM), Focus Ion Beam (FIB), Atomic Force Microscopy (AFM), or X-Ray Diffraction (XRD) of the device.

20 Claims, 15 Drawing Sheets

Layers Data

| MQBs | MQWs | MEAN | RANGE | RMS | STANDARD DEVIATION |
|---|---|---|---|---|---|
| | 1 | 3.08 | 0.28 | 3.08 | 0 |
| 1 | 2 | 10.85 | 0.28 | 10.85 | 0.099 |
| | 3 | 3.15 | 0.42 | 3.15 | 0.099 |
| 2 | 4 | 10.71 | 0.28 | 10.71 | 0.099 |
| | 5 | 3.15 | 0.14 | 3.15 | 0.099 |
| 3 | 6 | 10.57 | 0.28 | 10.57 | 0.099 |
| | 7 | 3.15 | 0.28 | 3.15 | 0.099 |
| 4 | 8 | 10.78 | 0.42 | 10.78 | 0 |
| | 9 | 3.15 | 0.28 | 3.15 | 0.099 |
| 5 | 10 | 10.57 | 0.28 | 10.57 | 0.099 |
| | 11 | 3.29 | 0.42 | 3.29 | 0.099 |
| 6 | 12 | 10.36 | 0.14 | 10.36 | 0 |
| | 13 | 2.73 | 0.28 | 2.73 | 0.099 |
| 7 | 14 | 10.64 | 0.28 | 10.64 | 0.099 |
| | 15 | 2.8 | 0.14 | 2.8 | 0.198 |
| 8 | 16 | 10.78 | 0.28 | 10.78 | 0 |
| | 17 | 2.87 | 0.28 | 2.87 | 0.099 |
| 9 | 18 | 10.92 | 0.28 | 10.92 | 0 |
| | 19 | 2.8 | 0.28 | 2.8 | 0 |
| 10 | 20 | 10.36 | 0.14 | 10.36 | 0 |
| | 21 | 3.15 | 0.42 | 3.15 | 0.099 |
| 11 | 22 | 10.01 | 0.14 | 10.01 | 0.099 |
| | 23 | 2.87 | 0.28 | 2.87 | 0.099 |
| 12 | 24 | 12.39 | 0.28 | 12.39 | 0.099 |
| | 25 | 2.73 | 0.28 | 2.73 | 0.099 |
| 13 | 26 | 12.74 | 0.42 | 12.74 | 0 |
| | 27 | 2.66 | 0.14 | 2.66 | 0 |

…

DIMENSION CALCULATION METHOD FOR A SEMICONDUCTOR DEVICE

BACKGROUND

Technical Field

The present invention relates to a dimension calculation method for a semiconductor device, such as a FinFET or a LED. The boundaries or edge lines between neighboring layers are extracted from an electronic image taken by Transmission Electron Microscopy (TEM), Focus Ion Beam (FIB), Atomic Force Microscopy (AFM), or X-Ray Diffraction (XRD) over a semiconductor device.

Description of Related Art

In the process of semiconductor manufacturing, the performance of metrology equipment directly impacts yield. Fabs and equipment suppliers must ensure that their metrology results are within tolerances and maintain their ISO and QS quality certifications. This task becomes more challenging as the device features shrink and tolerances become tighter, to the extent of their physical limits in many cases. Especially, while the metrology tools in nanoscale regime provide 'precise, accurate, efficient, and effective' data; the error creeps in data collection, analysis, interpretation and presentation due to the manual or semi-auto data processing systems adopted in the present semiconductor industries. Accuracy of measurement not only depends on the metrology tools, but also directly depends on the data analysis and its interpretation. For example, nanoscale features imaged by XRD, SEM, AFM, FIB, TEM etc. and the critical dimensions are traditionally measured by manual over the images, which is not only consume a huge amount of time but also add an inaccuracy and uncertainty in the results. The results become meaningless while the inaccuracy and uncertainty become comparable to the tolerance. So the traditional manual or semi-auto data analysis or interpretation system thus cannot be reliable to estimate the nanoscale features from the data collected by the metrology tools. Therefore, an auto-metrology approach is eager in the semiconductor field to be developed for a more convincing and scientific to analyze and represent the data in a 'precise, accurate, efficient, and effective' way.

Figure 1:
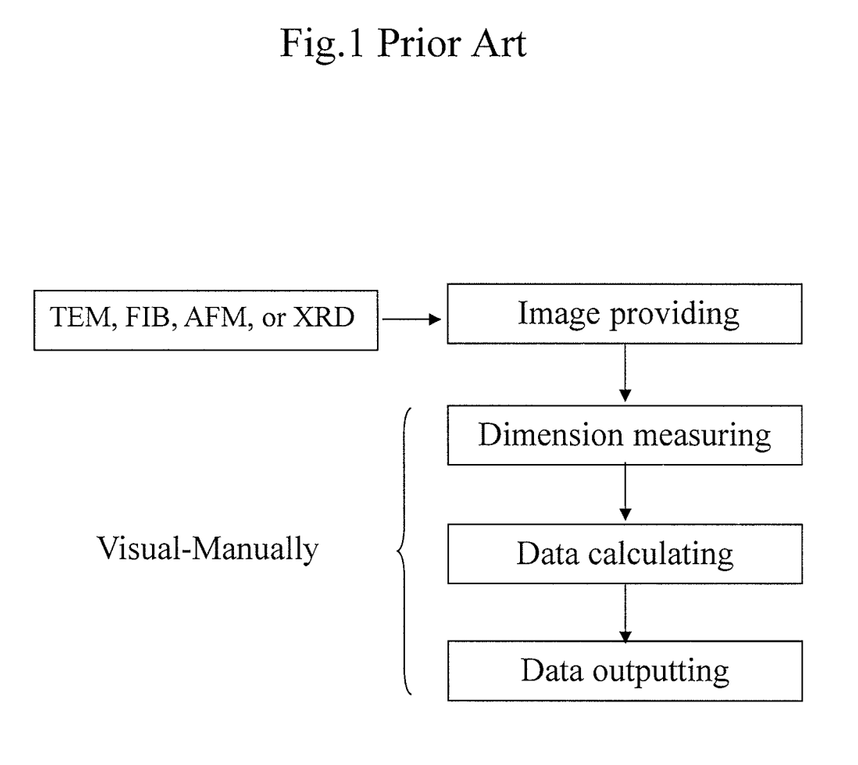
FIG. 1 shows a prior art

FIG. 1 shows a prior art

FIG. 1 shows a traditional metrology, e.g. thickness calculation, for a deposition layer of an electronic image, which comprises the following steps:

(1) Image providing;
(2) Dimension measuring; visual-manually operated;
(3) Data calculating; visual-manually operated; and
(4) Data outputting; visual-manually operated.

DETAILED DESCRIPTION OF THE INVENTION

The present invention discloses an automatic metrology, e.g. thickness calculation method, for each and all deposition/doped layers of a FinFET or an LED. An electronic image of a semiconductor device taken by TEM, FIB, AFM, or XRD is processed to extract the boundaries between different material layers; each of the non-continuous boundaries is than modified before mapping onto an Excel spreadsheet. Each of the physical parameters interested over the devices, such as thickness or width of a deposition layer, average value of thickness or width, deviation and/or Root-Mean-Square (RMS) for a statistics, Fin angle, radius of a curvature . . . etc., can be calculated automatically by a macro-instruction written over the Excel spreadsheet. The statistics can be selected to output to a printer and/or displayed on a display screen.

Figure 2:
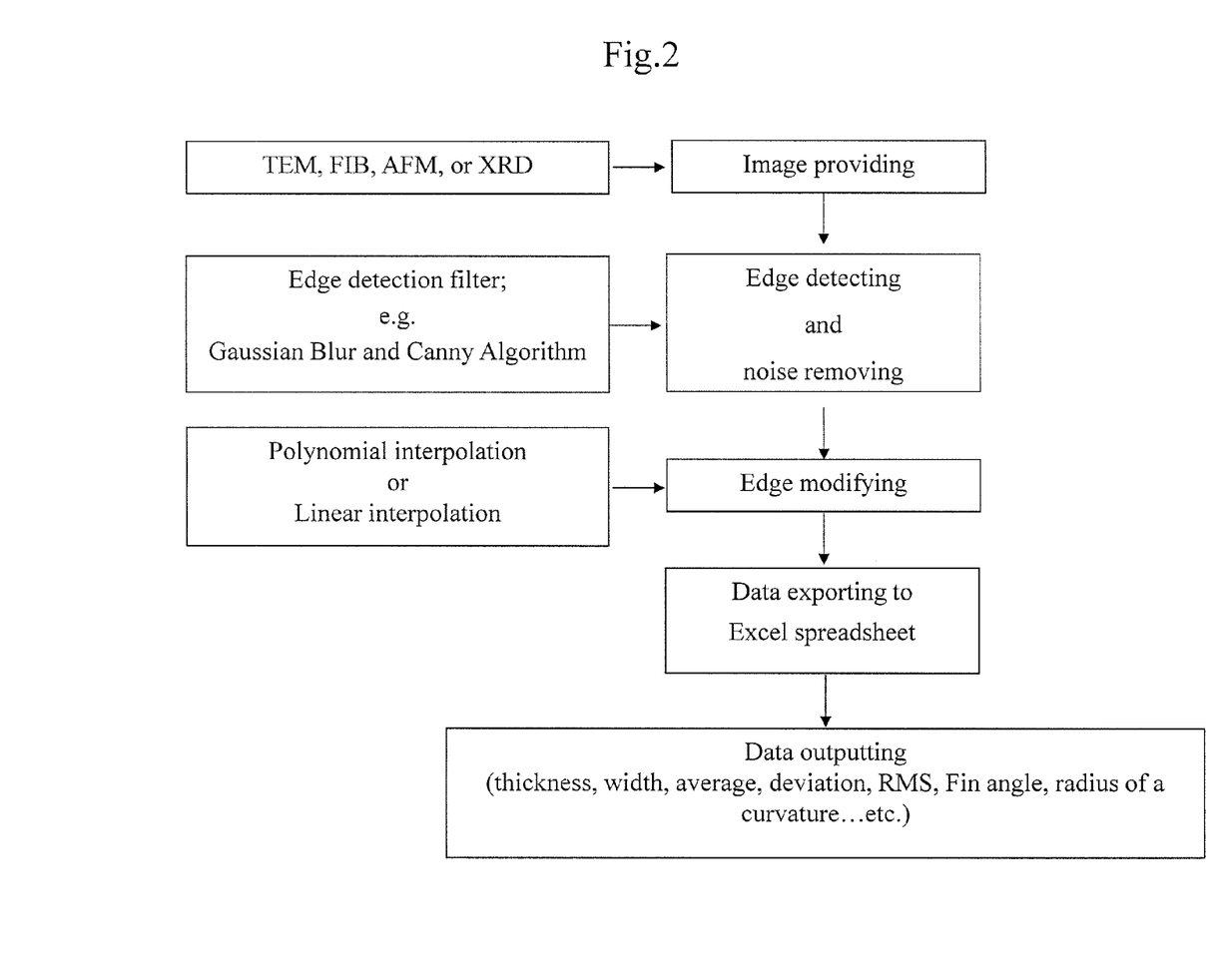
FIG. 2 shows a dimension calculation method according to the present invention.

FIG. 2 shows a dimension calculation method according to the present invention.

FIG. 2 shows that the calculation method includes the following steps:

(1) Image providing; an electronic image of TEM, FIB, AFM, or XRD is prepared;

(2) Edge detecting and noise removing; an edge detection filter such as Gaussian Blur and Canny Algorithm or equivalent is applied over the image to extract the boundaries between different deposition layers. Noise removing is then processed to remove unwanted dots or spots. The edge lines extracted are always non-continuous due to the image quality and the intrinsic property of the software to be used.

(3) Edge modifying; either a Polynomial Interpolation or a Linear Interpolation is adopted to modify the non-continuous edge lines and make each of them continuous.

(4) Data exporting to Excel spreadsheet; the edge lines are then mapping onto an Excel spreadsheet for data calculation.

(5) Data outputting; user can select one or more of the physical parameters including but not limited to the following to output to a printer or display on a display screen:
  (a) Thickness or width at a selected location of a deposition layer.
  (b) Average of the thickness or width for the deposition layer.
  (c) Deviation for the thickness or width.
  (d) Root-Mean-Square for the thickness or width.
  (e) Fin angle; and/or
  (f) Radius of a curvature.

FIGS. 3~8 shows a first embodiment according to the present invention.

Figure 3:
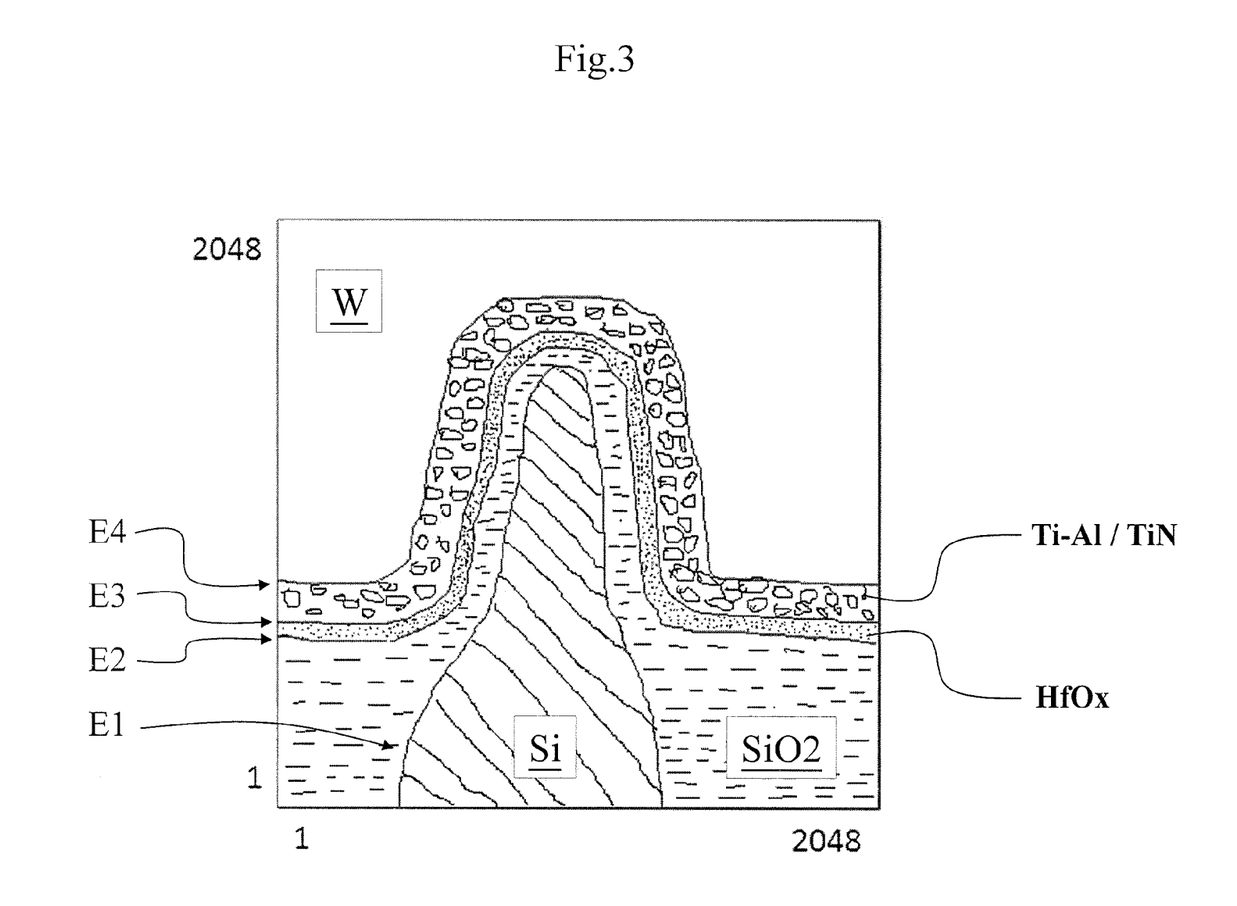
FIGS. 3~8 shows a first embodiment according to the present invention.

FIG. 3 shows an electronic image or picture of a FinFET taken by TEM to be analyzed, a similar image taken by FIB, AFM, or XRD can also be analyzed here in similar method. The FinFET has a fin-type Silicon (Si) configured in a center of the device; a layer of Silicon Dioxide (SiO2) is deposited to cover the top surface of the fin-type Silicon; a layer of Hafnium Oxide (HfOx) is deposited to cover the top surface of the Silicon Dioxide. A layer of Titanium Aluminide/Titanium Nitride (Ti—Al/TiN) is deposited to cover the top surface of the Hafnium Oxide. A layer of Tungsten (W) is deposited to cover the top surface of the Titanium Aluminide/Titanium Nitride (Ti—Al/TiN). There are four boundaries or edge lines E1, E2, E3, E4 between neighboring deposition layers in the image of FIG. 3. E1 indicates an edge line between Si—SiO2; E2 indicates an edge line between HfOx and SiOx; E3 indicates an edge line between Ti—Al/TiN and HfOx; and E4 indicates an edge line between W and Ti—Al/TiN.

Figure 4:
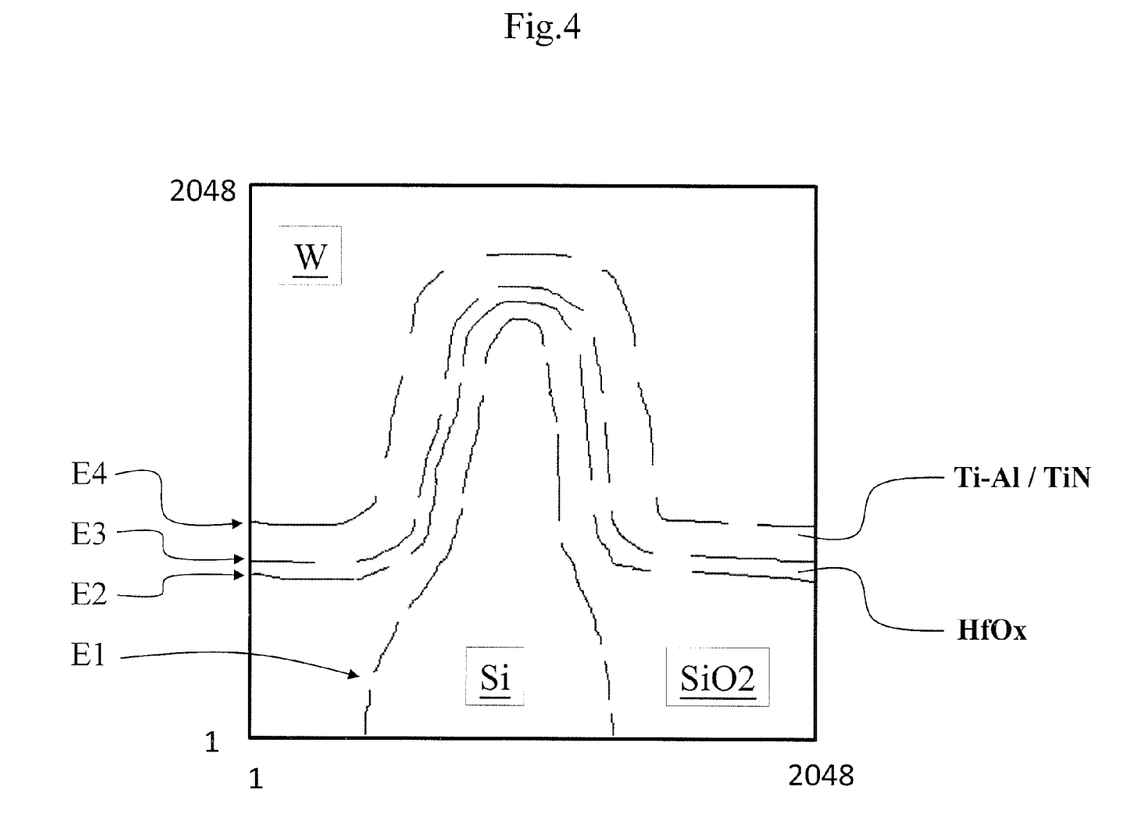

FIG. 4 shows the extracted edge lines from the image of FIG. 3

Due to the intrinsic property of the software used and the quality uncertainty of the electronic image, each of the extracted edge lines is usually non-continuous as shown in FIG. 4. An edge modifying process is then needs to be performed. A Polynomial Interpolation is adopted to modify the non-continuous curved lines. While a Linear Interpolation can be selected to modify a linear or a linear approximate line.

Figure 5:
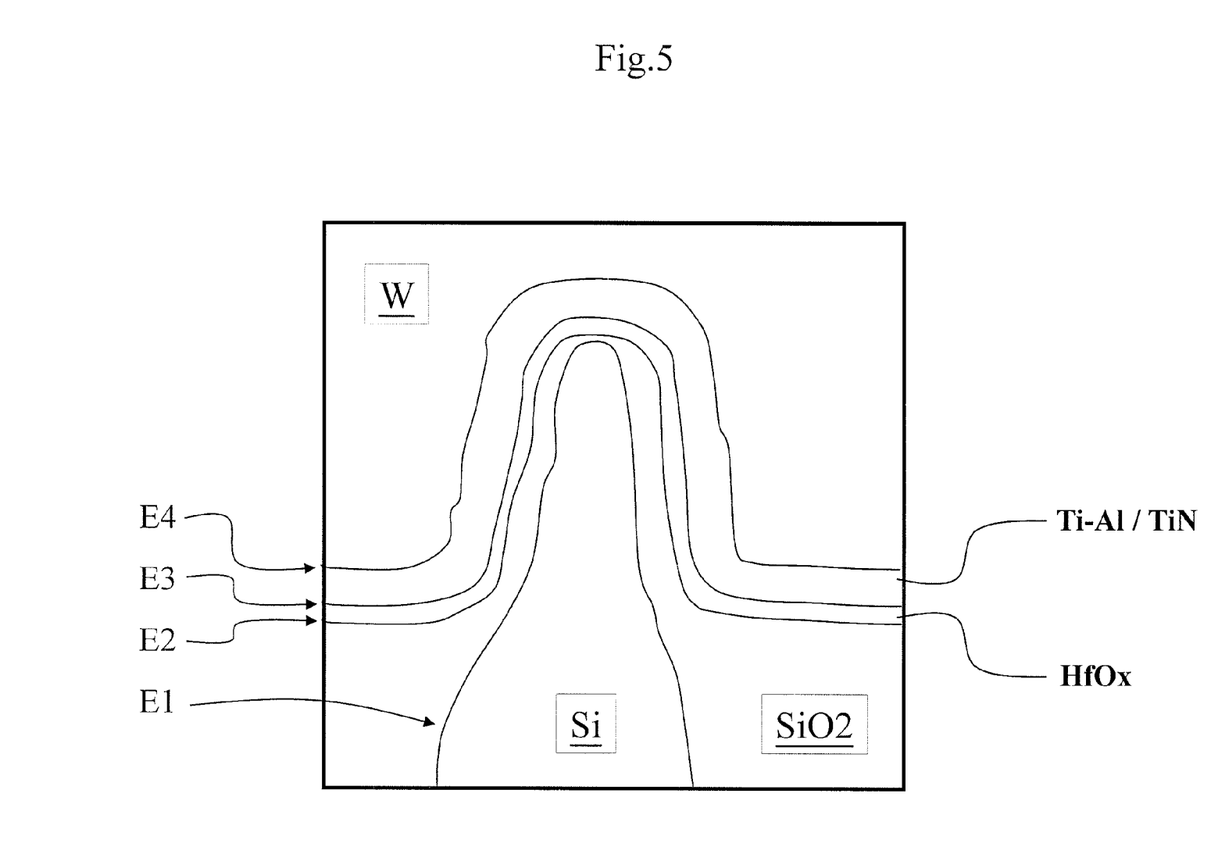

FIG. 5 shows a modified edge lines over the non-continuous edge lines of FIG. 4

A Polynomial Interpolation software is chosen here to modify the curve for the image of FIG. 4. FIG. 5 shows that each of the edge lines is a continuous one after the modification.

Figure 6:
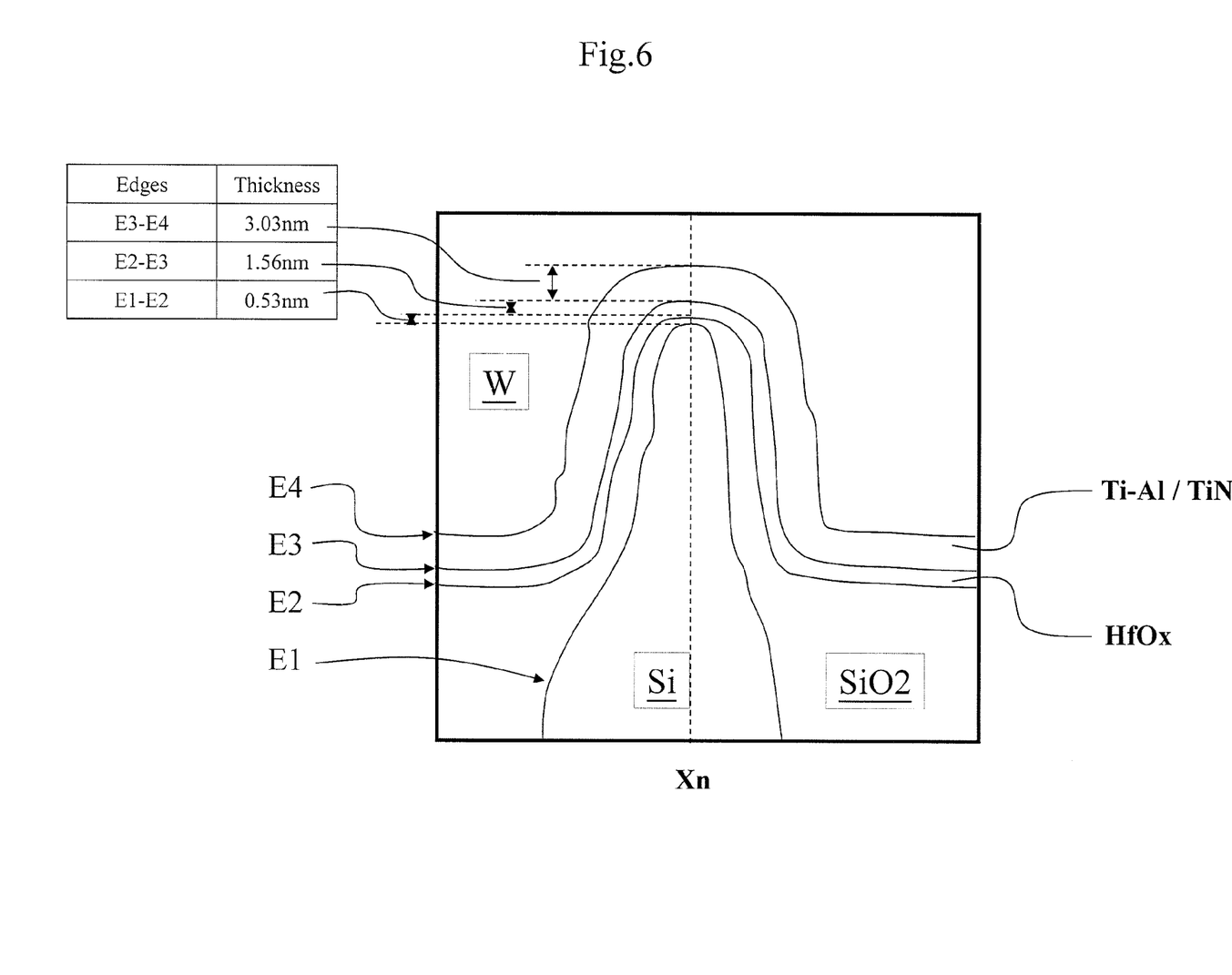

FIG. 6 shows the continuous edge lines mapped on an Excel spreadsheet and thickness measurement exemplified.

The physical parameters can be obtained by macro-instruction written based on the commercialized Excel application software.

Referring to FIG. 6. Thickness for three layers is exemplified at a randomly selected vertical line Xn. E3-E4 is 3.03 nm for the thickness of Ti—Al/TiN layer at the position of the vertical line Xn. E2-E3 is 1.56 nm for the thickness of HfOx layer at the position of the vertical line Xn. E1-E2 is 0.53 nm for the thickness of SiO2 layer at the position of the vertical line Xn.

Figure 7:
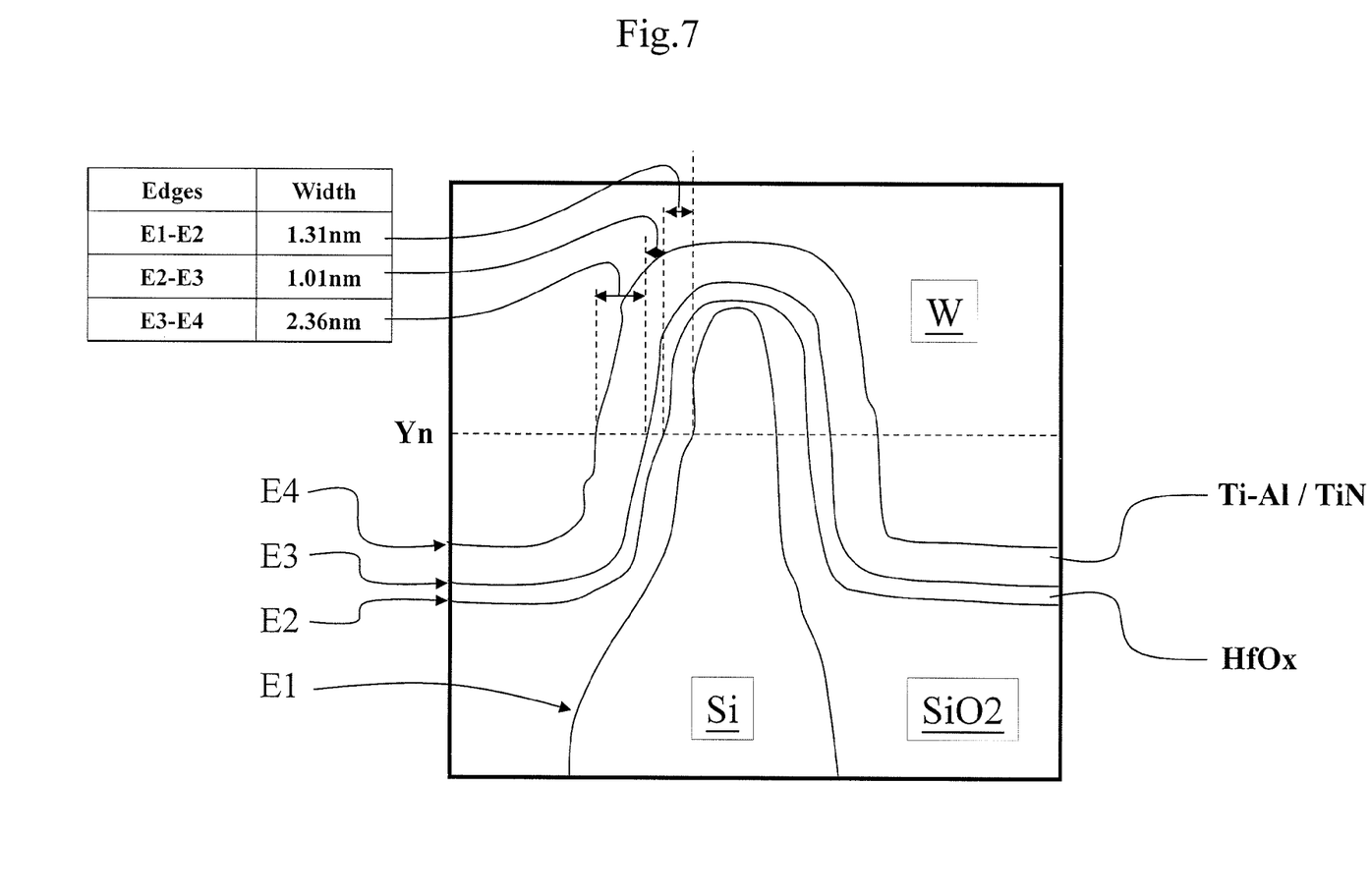

FIG. 7 shows the continuous edge lines mapped on an Excel spreadsheet and width measurement exemplified.

Referring to FIG. 7. Width or thickness for three layers is exemplified at a randomly selected horizontal line Yn. E1-E2 is 1.31 nm which represents the width or thickness of SiO2 layer at the position of the horizontal line Yn. E2-E3 is 1.01 nm which represents the thickness of HfOx layer at the position of the horizontal line Yn. E3-E4 is 2.36 nm which represents the thickness of Ti—Al/TiN layer at the position of the horizontal line Yn.

Figure 8:
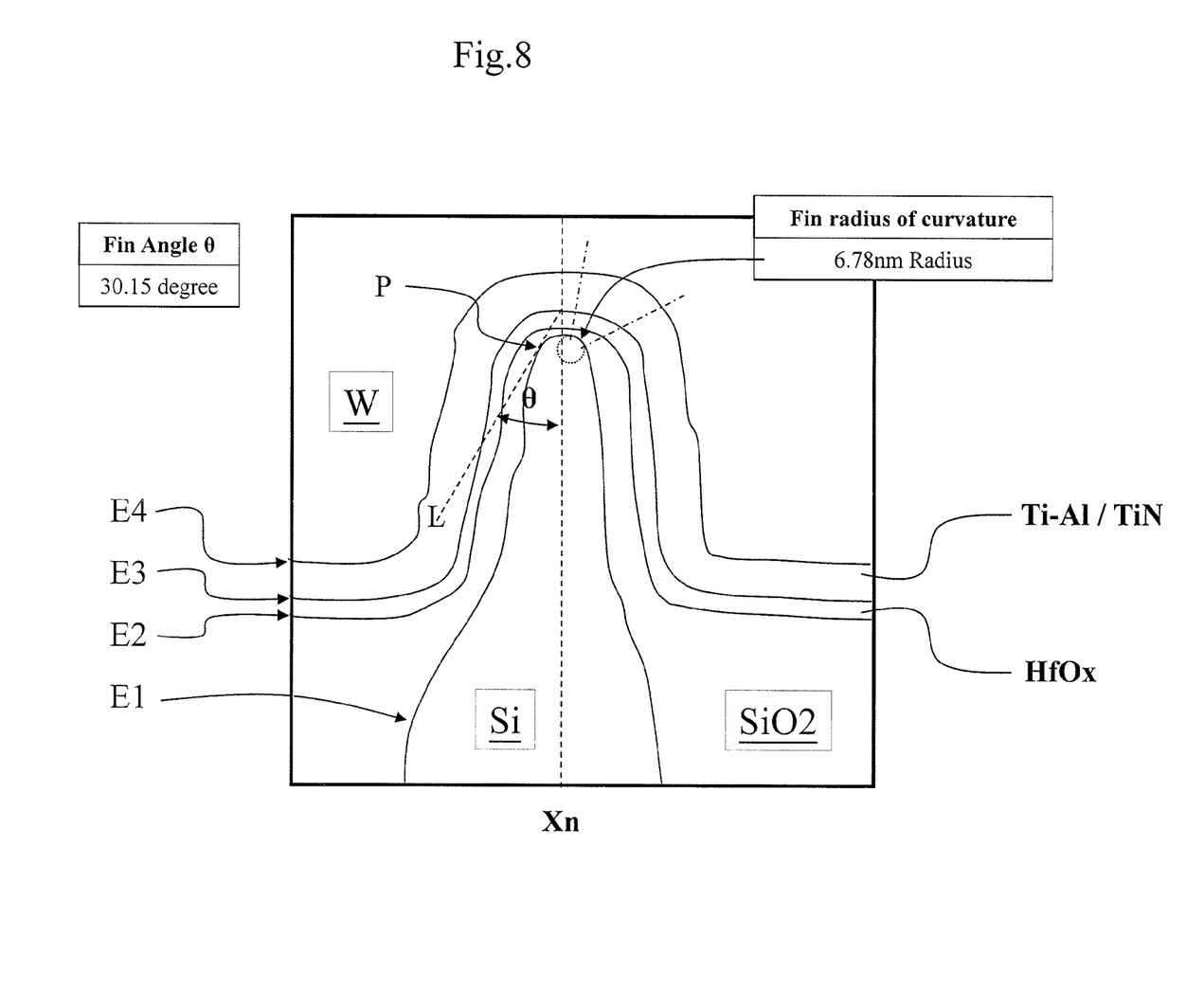

FIG. 8 shows the continuous edge lines mapped on an Excel spreadsheet and Fin angle and fin radius of curvature exemplified.

A randomly selected vertical line Xn is made on the figure and a tangent line L is made over a randomly selected point P on the edge line E1. A Fin Angle θ is formed between the tangent line L and the vertical Line Xn. The Fin Angle θ is 30.15 degree at point P shown in FIG. 8. A radius of curvature is 6.78 nm at a randomly selected curvature on the right side of edge line E1.

FIGS. 9~15 shows a second embodiment according to the present invention.

The similar metrology described above for the FinFET can also be applied on the epitaxial layers of a LED device. The accurate measurement with least uncertainty and quantification of the local change in the width of the epitaxial layers including super lattices and multiple quantum wells (MQWs) in a LED device is critical for its performance and optimization of the device.

Figure 9:
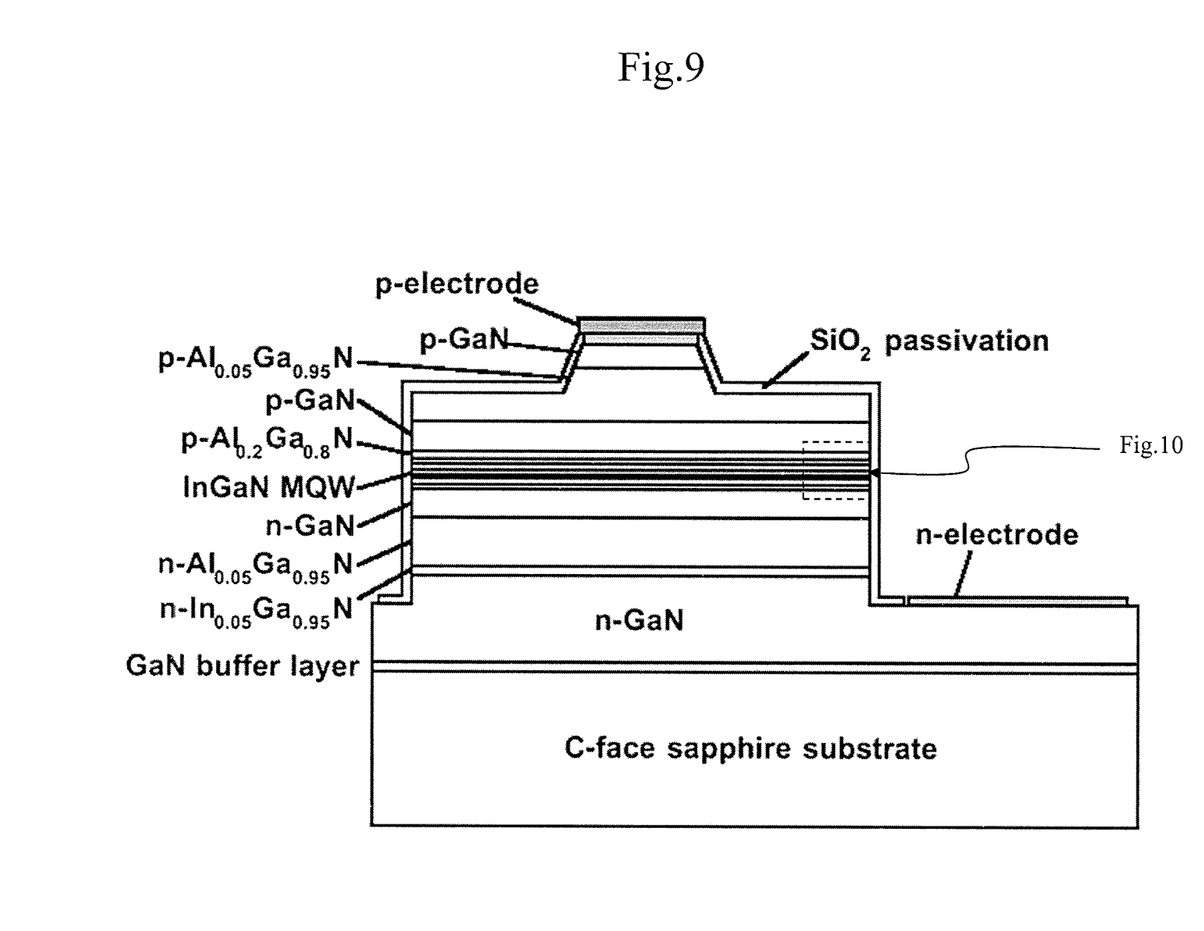
FIGS. 9~15 shows a second embodiment according to the present invention.

FIG. 9 shows a section view of a typical LED device.

FIG. 9 shows a section view of a typical LED device. There are several different deposition layers. Please see the dashed square in FIG. 9, where a superlattice structure and quantum well structure are located. The structure in the dashed square is then enlarged in FIG. 10.

Figure 10:
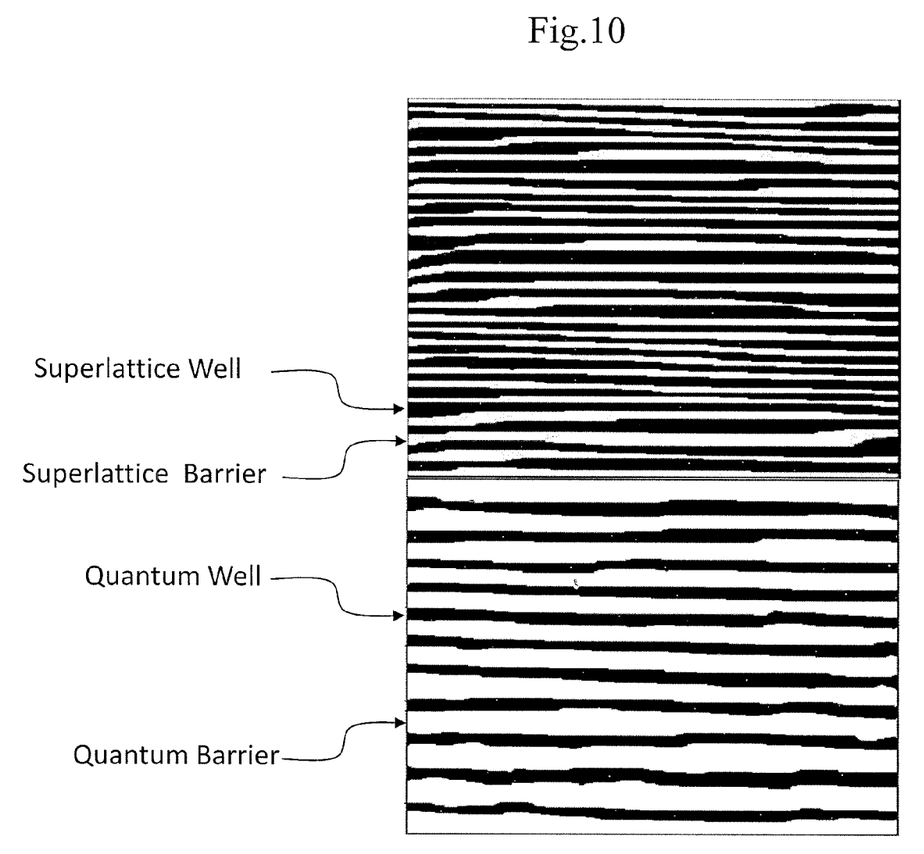

FIG. 10 shows an electronic image of the superlattice structure and the quantum well structure.

FIG. 10 shows an electronic image of the superlattice structure and the quantum well structure of an LED taken by TEM to be analyzed, a similar image taken by FIB, AFM, or XRD can also be analyzed here. It can be seen that the superlattice structure is configured on the top, and the multiple quantum well structure is configured on the bottom with reference to the superlattice structure. The superlattice structure is composed of interleaved wells and barriers, each of the wells and barriers is in the form of nanometer thin layer; and the multiple quantum well is also composed of interleaved wells and barriers, each of the wells and barriers is in the form of nanometer thin layer.

Figure 11:
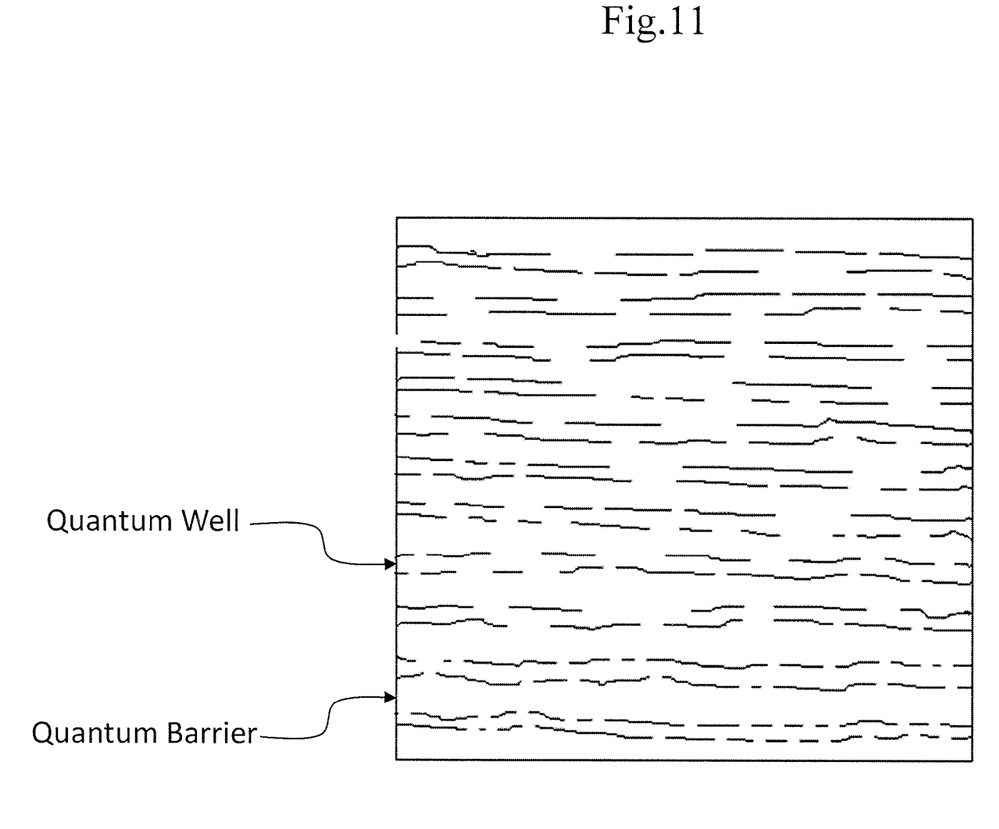

FIG. 11 shows the edge lines extracted the image of FIG. 10 and only the multiple quantum wells and multiple quantum barriers are exemplified in the FIG. 11.

Due to the intrinsic property of the software used and the quality uncertainty of the image, each of the extracted edge lines is usually non-continuous. An edge modifying process needs to be performed. A Linear Interpolation is adopted to modify the linear or linear approximate line.

Figure 12:
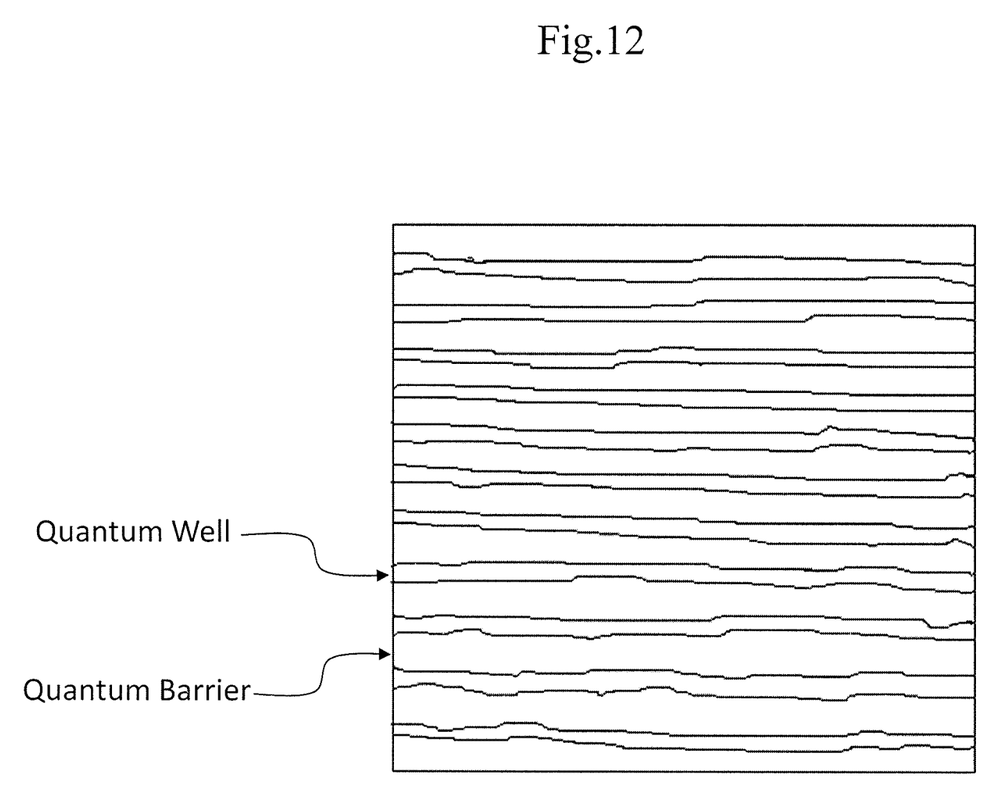

FIG. 12 shows a modified edge lines over the non-continuous edge lines of FIG. 11

A Linear Interpolation software is chosen here to modify the edge lines for the image of FIG. 11. FIG. 12 shows that each of the edge lines between quantum well and quantum barrier is a continuous one after the modification.

Figure 13:
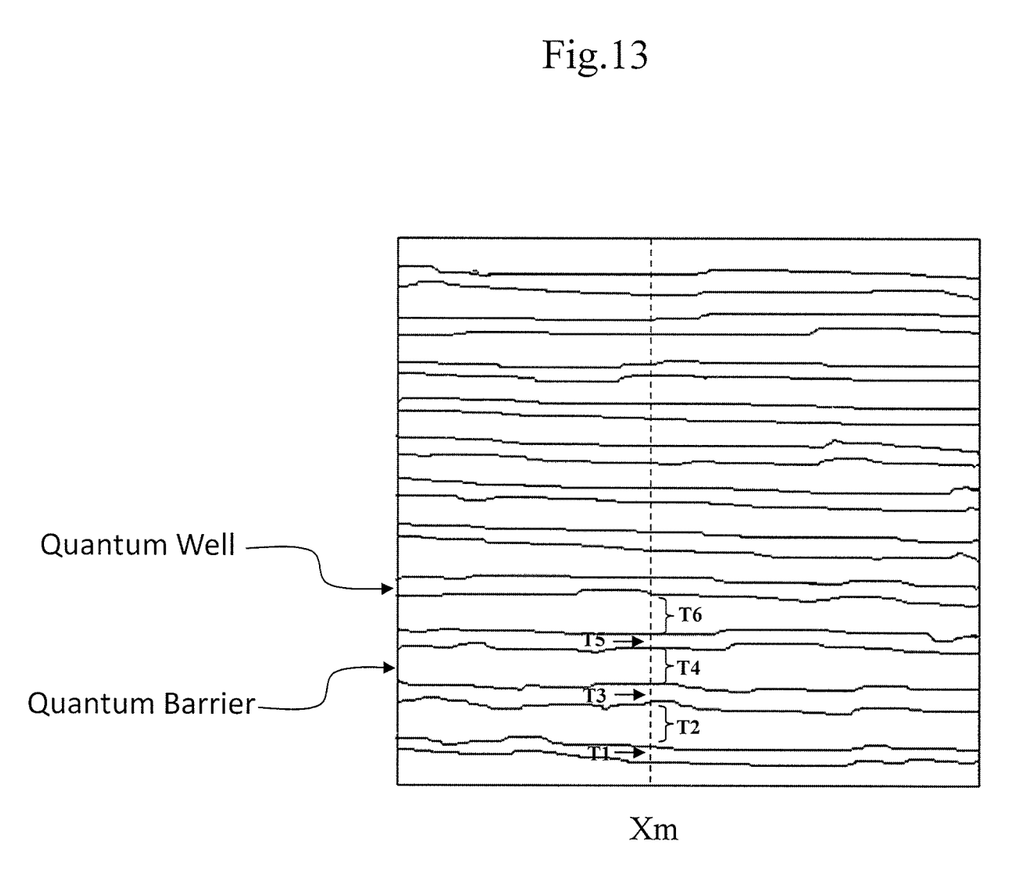

FIG. 13 shows the continuous edge lines mapped on an Excel spreadsheet and thickness measurement exemplified.

The physical parameters can be obtained by macro-instruction written based on the commercialized Excel application software.

Thickness T1, T2, T3 for each of the three quantum wells is exemplified at a randomly selected vertical line Xm; and Thickness T2, T4, T6 for each of the three quantum barriers is exemplified at a randomly selected vertical line Xm. Similarly, thickness for each and all the quantum wells and/or the quantum barriers can be obtained at any designated vertical line. Additional statistic such as mean value, deviation, RMS . . . etc., can be made automatically for each and all of the quantum wells and/or the quantum barriers.

Figure 14:
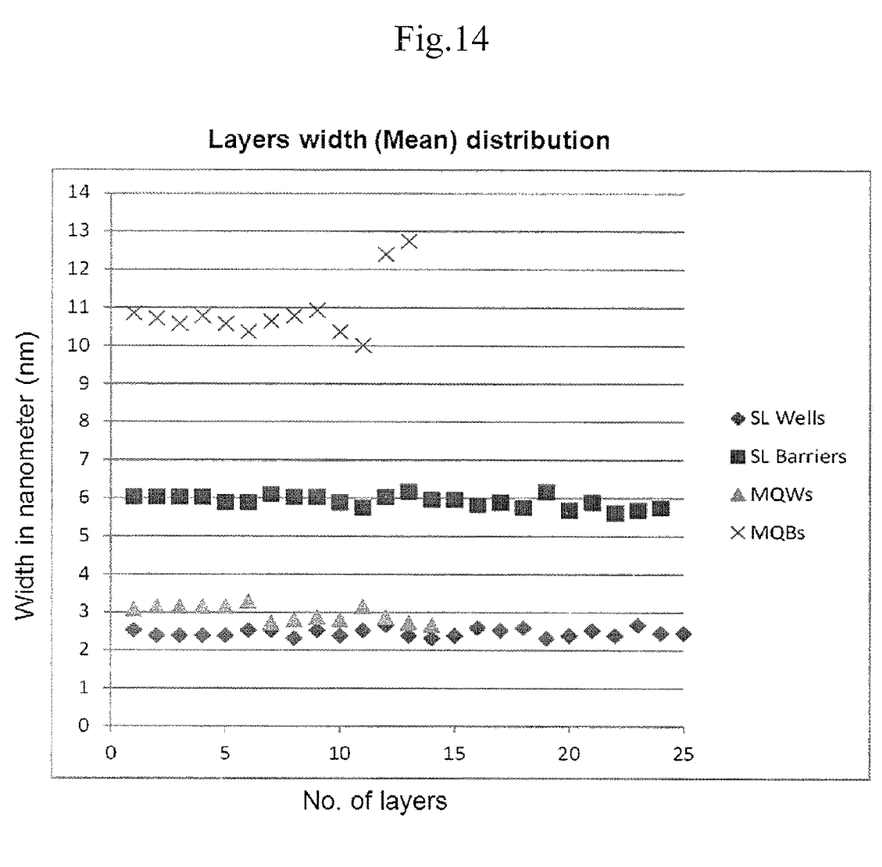

FIG. 14 shows typical physical parameters determined for the superlattice and quantum well.

FIG. 14 shows Layer width (Mean) distribution for the superlattice and multiple quantum well. The X-coordinate shows the number of layers and the Y-coordinate shows the width in nanometer (nm). Where "solid diamond" represents the superlattice wells (SL Wells), "solid square" represents superlattice barriers (SL Barriers), "solid triangle" represents multiple quantum wells (MQWs), and "cross" represents multiple quantum barriers (MQBs). The average thickness of SL Wells is between 2~3 nm. The average thickness of MQWs is between 2.5~3.5 nm. The average thickness of SL Barriers is around 5.5~6.5 nm; and the average thickness of MQBs is mostly between 10~11 nm.

Figure 15:
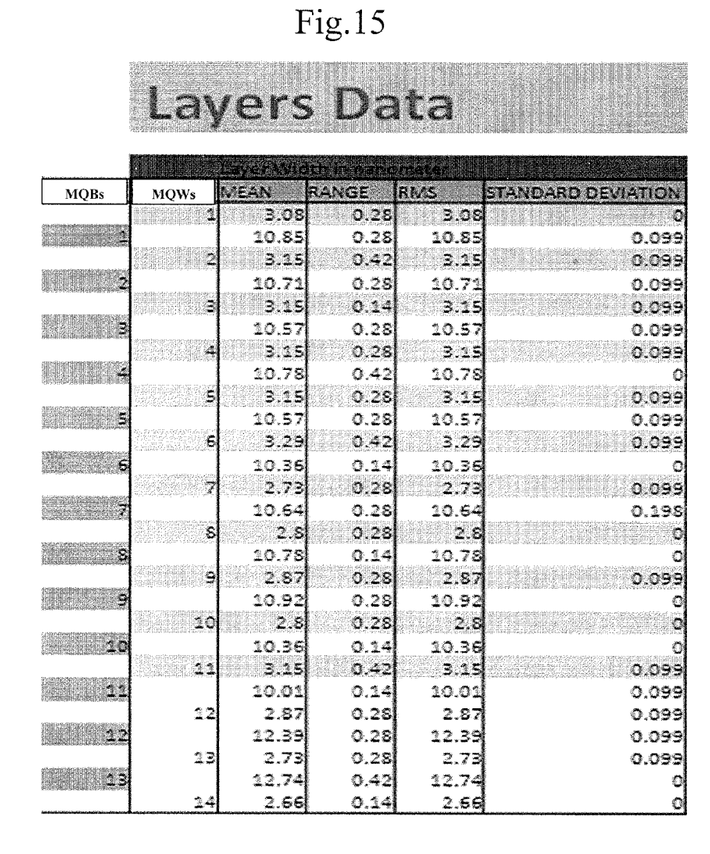

FIG. 15 shows layers data statistics for the multiple quantum wells and multiple quantum barriers.

FIG. 15 shows multiple quantum barrier layers in the first column; multiple quantum well layers in the second column; mean value in the third column; distribution range in the fourth column; RMS in the fifth column; and standard deviation in the sixth column.

While several embodiments have been described by way of example, it will be apparent to those skilled in the art that various modifications may be configured without departs from the spirit of the present invention. Such modifications are all within the scope of the present invention, as defined by the appended claims.

What is claimed is:

1. A dimension calculation method for a semiconductor device, the method comprising:
    image providing which comprises providing an image of the semiconductor device;

edge detecting which comprises detecting, in the image, boundaries between different layers of the semiconductor device, said detected boundaries being non-continuous;

edge modifying which comprises modifying the detected, non-continuous boundaries to be continuous boundaries;

data exporting which comprises mapping the continuous boundaries on an Excel spreadsheet; and data outputting which comprises outputting at least one physical parameter of the semiconductor device, said at least one physical parameter being automatically calculated in the Excel spreadsheet.

2. A dimension calculation method as claimed in claim 1, wherein the image is provided by one selected from the group consisting of: Transmission Electron Microscopy (TEM), Focus Ion Beam (FIB), Atomic Force Microscopy (AFM), and X-Ray Diffraction (XRD).

3. A dimension calculation method as claimed in claim 1, wherein the edge detecting is performed by an edge detection filter.

4. A dimension calculation method as claimed in claim 3, wherein the edge detection filter is a Gaussian Blur and Canny algorithm.

5. A dimension calculation method as claimed in claim 1, wherein the edge modifying is performed by one selected from the group consisting of a Polynomial Interpolation and a Linear Interpolation.

6. A dimension calculation method as claimed in claim 1, wherein the at least one physical parameter outputted in the data outputting comprises one or more selected from the group consisting of
a thickness of a layer among the different layers of the semiconductor device,
a width of a layer among the different layers of the semiconductor device,
an average value of a thickness or a width of a layer among the different layers of the semiconductor device,
a deviation value of a thickness or a width of a layer among the different layers of the semiconductor device,
an RMS value of a thickness or a width of a layer among the different layers of the semiconductor device,
a Fin angle at a convex section of a continuous boundary among the continuous boundaries, and
a radius of a curvature at a convex section of a continuous boundary among the continuous boundaries.

7. A dimension calculation method as claimed in claim 1, wherein the semiconductor device is a fin-type field-effect transistor (FinFET).

8. A dimension calculation method as claimed in claim 1, wherein the semiconductor device is a Light Emitting Diode (LED), and the image is an image of a superlattice structure of the device.

9. A dimension calculation method as claimed in claim 1, wherein the semiconductor device is a Light Emitting Diode (LED), and the image is an image of a Multiple Quantum Well (MQW) of the device.

10. A dimension calculation method as claimed in claim 1, further comprising:
noise removing which comprises removing noise from the image before said edge modifying.

11. A dimension calculation method as claimed in claim 1, wherein the at least one physical parameter is automatically calculated by macro instructions in the Excel spreadsheet after said mapping the continuous boundaries on the Excel spreadsheet.

12. A dimension calculation method as claimed in claim 11, wherein the image is an image of a cross-section of the semiconductor device.

13. A dimension calculation method as claimed in claim 12, wherein the at least one physical parameter outputted in the data outputting comprises
a thickness of a layer among the different layers of the semiconductor device.

14. A dimension calculation method as claimed in claim 13, wherein the at least one physical parameter outputted in the data outputting further comprises one or more selected from the group consisting of
an average value of a thickness of a layer among the different layers of the semiconductor device,
a deviation value of a thickness of a layer among the different layers of the semiconductor device, and
an RMS value of a thickness of a layer among the different layers of the semiconductor device.

15. A dimension calculation method as claimed in claim 14, wherein the at least one physical parameter outputted in the data outputting further comprises
a width of a layer among the different layers of the semiconductor device.

16. A dimension calculation method as claimed in claim 15, wherein the at least one physical parameter outputted in the data outputting further comprises one or more selected from the group consisting of
an average value of a width of a layer among the different layers of the semiconductor device,
a deviation value of a width of a layer among the different layers of the semiconductor device, and
an RMS value of a width of a layer among the different layers of the semiconductor device.

17. A dimension calculation method as claimed in claim 16, wherein the at least one physical parameter outputted in the data outputting further comprises one or more selected from the group consisting of
a Fin angle at a convex section of a continuous boundary among the continuous boundaries, and
a radius of a curvature at a convex section of a continuous boundary among the continuous boundaries.

18. A dimension calculation method as claimed in claim 17, wherein the semiconductor device is a fin-type field-effect transistor (FinFET).

19. A dimension calculation method as claimed in claim 17, wherein the semiconductor device is a Light Emitting Diode (LED), and the image is an image of a superlattice structure of the device.

20. A dimension calculation method as claimed in claim 17, wherein the semiconductor device is a Light Emitting Diode (LED), and the image is an image of a Multiple Quantum Well (MQW) of the device.

* * * * *